(12) United States Patent
Okawara

(10) Patent No.: US 6,661,585 B2
(45) Date of Patent: Dec. 9, 2003

(54) ZOOM LENS CONTROL APPARATUS

(75) Inventor: Hiroto Okawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/212,752

(22) Filed: Aug. 7, 2002

(65) Prior Publication Data

US 2003/0030920 A1 Feb. 13, 2003

(30) Foreign Application Priority Data

Aug. 10, 2001 (JP) ........................................ 2001-244932

(51) Int. Cl.$^7$ .............................................. G02B 15/14
(52) U.S. Cl. ...................................... 359/697; 359/696
(58) Field of Search ................................ 359/697, 694, 359/696, 698, 823

(56) References Cited

U.S. PATENT DOCUMENTS

| | | | | |
|---|---|---|---|---|
| 4,043,652 A | * | 8/1977 | Mickelson | ................. 353/26 A |
| 5,027,147 A | * | 6/1991 | Kaneda | ........................ 396/81 |
| 5,144,491 A | * | 9/1992 | Ushiro et al. | ................ 359/697 |
| 5,267,085 A | * | 11/1993 | Sasaki et al. | ................ 359/694 |
| 5,742,435 A | * | 4/1998 | Nagashima et al. | ......... 359/696 |
| 6,208,472 B1 | * | 3/2001 | Wachi | ......................... 359/697 |

\* cited by examiner

*Primary Examiner*—Ricky Mack
(74) *Attorney, Agent, or Firm*—Fitzpatrick, Cella, Harper & Scinto

(57) ABSTRACT

This invention discloses a zoom lens control apparatus which has a first lens unit for executing magnification operation, and a second lens unit for correcting variations in image plane along with magnification operation of the first lens unit and serving as a focusing function, and drives the second lens unit on the basis of a focus adjustment signal, including a first setting circuit which sets a first moving range for the second lens unit along with movement of the first lens unit, and a second setting circuit which sets a second moving range different from the moving range for the second lens unit along with movement of the first lens unit.

9 Claims, 9 Drawing Sheets

$$a_x = a_k - \frac{(z_k - z_{k-1})(a_k - a_{k-1})}{(z_k - z_{k-1})}$$

$$b_x = b_k - \frac{(z_k - z_{k-1})(b_k - b_{k-1})}{(z_k - z_{k-1})}$$

ZOOM LENS CONTROL APPARATUS

BACKGROUND OF THE INVENTION

1. Field of the Invention

The present invention relates to a zoom lens control apparatus, zoom lens control method, program, and storage medium and, more particularly, to a zoom lens control apparatus which moves the second lens unit for correcting a focal plane along with movement of the first lens unit for performing magnification operation, a zoom lens control method applied to the zoom lens control apparatus, a program for causing a computer to execute the zoom lens control method, and a storage medium which stores the program.

2. Related Background Art

Image pickup apparatuses such as a video camera which incorporates an inner focus type lens system have been conventionally available.

FIG. 3 is a view schematically showing an inner focus type lens system.

In FIG. 3, the lens system comprises a fixed lens group 101 serving as a front lens group, a zoom lens (magnification lens) 102 serving as a lens group for performing magnification operation, an aperture stop 103, a fixed lens group 104, a focus lens 105 serving as a lens group with a focus adjustment function (focusing function), and an image pickup element 106 formed from a CCD. The focus lens 105 also has a so-called compensation function of compensating for movement of the focal plane caused by magnification operation of the zoom lens 102.

As is well known, the focus lens 105 has both the compensation function and focus adjustment function in the lens system having the arrangement shown in FIG. 3. Even with the same focal length, the position of the focus lens 105 for focusing the lens on the plane of the image pickup element 106 changes depending on the object distance. When the position of the focus lens 105 for focusing the lens on the plane of the image pickup element 106 is plotted along with changes in focal length at each object distance, characteristics as shown in FIG. 4 are obtained. FIG. 4 shows the focus lens position by a locus (curve) as a function of the focal length for each object distance (e.g., 80 cm, 3 m, or ∞). During magnification operation, a locus shown in FIG. 4 is selected in accordance with the object distance. When the zoom lens 102 is driven to change the focal length, the focus lens 105 is moved along the locus, thus realizing zooming without any blur.

In a front focus type lens system, an independent compensation lens is arranged for the magnification lens, and the magnification lens and compensation lens are coupled via a mechanical cam ring. For example, a manual zooming dial is attached to the cam ring, and the focal length is manually changed. Even if the dial is quickly changed, no blur occurs in this operation as far as the focus lens is in focus because the cam ring rotates following the dial operation and the magnification lens and compensation lens move along the cam groove of the cam ring.

In the control of the inner focus type lens system having the above-mentioned features, characteristic information about a plurality of loci shown in FIG. 4 is generally stored in some format in a lens control microcomputer. A locus is selected in accordance with the object distance, and movement of the focal plane by magnification operation is corrected along the selected locus in zooming. The position of the focus lens 105 is controlled by reading out the position of the focus lens 105 with respect to the position (focal length) of the zoom lens 102 from the lens control microcomputer. For this purpose, the performance of an actuator which drives the focus lens 105 is important. As is apparent from FIG. 4, when the zoom lens 102 moves at a constant speed or almost constant speed at the same object distance, the moving speed and moving direction of the focus lens 105 momently change. In other words, the actuator of the focus lens 105 must respond to the speed with a high precision of about 1 Hz to several hundred Hz.

An example of the actuator having this performance is a stepping motor, which is generally being used for the focus lens 105 of the inner focus lens system. The stepping motor rotates in perfect synchronism with a stepping pulse output from the lens control microcomputer or the like, and keeps the stepping angle per pulse constant. The stepping motor can, therefore, obtain a high speed response characteristic, high stop precision, and high position precision. Further, the stepping motor keeps the rotation angle constant with respect to the number of stepping pulses. The stepping pulse can be directly used as an increment type encoder, and no special position encoder needs to be added to the lens system.

To perform magnification operation while keeping an in-focus state by using the stepping motor, locus information shown in FIG. 4 must be stored in the lens control microcomputer or the like, as described above. Locus information is read out in accordance with the position or moving speed of the magnification lens, and the focus lens is moved based on the information. Alternatively, a function which expresses the position of the focus lens 105 by using the object distance and the focal length of the zoom lens 102 as variables may be adopted.

A method of performing compensation calculation between loci and calculating the standard moving speed of the focus lens in the use of the locus data table will be explained.

FIG. 5 is a graph showing an example of the locus characteristic used in a conventional locus tracing method applied when magnification operation is executed while an in-focus state is maintained using a stepping motor. The locus characteristic is stored in the lens control microcomputer.

In FIG. 5, $Z_0$, $Z_1$, $Z_2$, ..., $Z_6$ represent positions of the magnification lens (zoom lens); and $a_0$, $a_1$, $a_2$, ..., $a_6$ and $b_0$, $b_1$, $b_2$, ..., $b_6$, typical loci indicating focus positions for respective object distances. $p_0$, $p_1$, $p_2$, ..., $p_6$ represent intermediate loci each calculated based on the two loci, and are calculated by $$p_{(n+1)} = |p_{(n)} - a_{(n)}| / |b_{(n)} - a_{(n)}| \times |b_{(n+1)} - a_{(n+1)}| + a_{(n+1)} \quad (1)$$

For example, a point $p_1$ is calculated by equation (1), a ratio with which a point $p_0$ internally divides a line segment $(b_0 - a_0)$ is obtained, and a point which internally divides a line segment $(b_1 - a_1)$ in accordance with this ratio is set as $p_1$. When the focus lens 105 is located at the point $p_0$, the standard moving speed of the focus lens 105 for maintaining an in-focus state can be obtained from the position difference $(p_1 - p_0)$ between the points $p_1$ and $p_0$, and the time taken to move the zoom lens 102 from the position $Z_0$ to the position $Z_1$.

Calculation of the position of the focus lens 105 when the stop position of the zoom lens 102 is not a position (zoom boundary position) on stored typical locus data will be explained.

FIG. 6 is a locus graph for explaining an interpolation method in the direction of the magnification lens position. Some of data in FIG. 5 are extracted, and magnification lens position data are arbitrarily set.

In FIG. 6, the ordinate and abscissa respectively represent the positions of the focus lens 105 and zoom lens 102. Typical locus positions (discrete positions of the focus lens 105 for discrete positions of the zoom lens 102) stored in the lens control microcomputer are represented by zoom lens positions $Z_0, Z_1, \ldots, Z_{k-1}, Z_k, \ldots, Z_n$, and focus lens positions $a_0, a_1, \ldots a_{k-1}, a_k, \ldots, a_n$ and $b_0, b_1, \ldots, b_{k-1}, b_k, \ldots, b_n$ for respective object distances at the zoom lens positions $Z_0, Z_1, \ldots, Z_{k-1}, Z_k, \ldots, Z_n$. Assume that the zoom lens position is an intermediate position $Z_x$ which is not a discrete position (zoom boundary position) on locus data, and $a_x$ and $b_x$ represent focus lens positions on locus data for respective object distances at the intermediate position $Z_x$. The focus lens positions $a_x$ and $b_x$ are calculated by $$a_x = a_k - (Z_k - Z_x) \times (a_k - a_{k-1})/(Z_k - Z_{k-1}) \quad (2)$$

$$b_x = b_k - (Z_k - Z_x) \times (b_k - b_{k-1})/(Z_k - Z_{k-1}) \quad (3)$$

That is, $a_x$ and $b_x$ can be calculated by internally dividing line segments between data for the same object distances among four stored typical locus data ($a_k$, $a_{k-1}$, $b_k$, and $b_{k-1}$) in accordance with an internal ratio obtained from the current magnification lens position $Z_x$ and the two sandwiching zoom boundary positions ($Z_{k-1}$ and $Z_k$).

Let $p_0, p_1, \ldots p_{k-1}, p_x, p_k, \ldots, p_n$ be focus lens positions (loci) between the focus lens positions (loci) $a_0, a_1, \ldots, a_{k-1}, a_x, a_k, \ldots, a_n$ and the focus lens positions (loci) $b_0, b_1, \ldots, b_{k-1}, b_x, b_k, \ldots, b_n$. Then, $p_k$ and $p_{k-1}$ can be calculated by internally dividing line segments between data for the same focal lengths among the four stored typical data ($a_k$, $a_{k-1}$, $b_k$, and $b_{k-1}$) in accordance with an internal ratio obtained from $a_x$, $p_x$, and $b_x$, as given by equation (1). In zooming from the wide-angle end to the tele-photo end, the moving speed of the focus lens 105 for maintaining an in-focus state can be attained from the position difference between a tracing destination focus position $p_k$ and a current focus position $p_x$, and a time taken for the zoom lens 102 to move from $Z_x$ to $Z_k$. In zooming from the tele-photo end to the wide-angle end, the standard moving speed of the focus lens 105 for maintaining an in-focus state can be attained from the position difference between a tracing destination focus position $p_{k-1}$ and a current focus position $p_x$, and a time taken for the zoom lens 102 to move from $Z_x$ to $Z_{k-1}$. This locus tracing method has been invented.

When the zoom lens 102 moves from the tele-photo end to the wide-angle end, an in-focus state can be maintained by the above-described locus tracing method because varying loci converge in this direction, as is apparent from FIG. 4. However, when the zoom lens 102 moves from the wide-angle end to the tele-photo end, an in-focus state cannot be maintained by the same locus tracing method because which of loci is traced by the zoom lens 102 located at a convergence point is not known.

FIGS. 7A and 7B are graphs for explaining a conventional locus tracing method invented to solve the above problem. In FIGS. 7A and 7B, the abscissa represents the zoom lens position. The ordinates in FIGS. 7A and 7B represent the AF evaluation signal level and focus lens position, respectively. An AF evaluation signal is a sharpness signal representing the in-focus degree, and is formed from the high-frequency component of an image signal.

In FIGS. 7A and 7B, the in-focus cam locus in zooming in on a given object to be picked up is a locus 604. In this case, the standard moving speed of tracing the in-focus cam locus on a wide-angle (W) side from a zoom position 606 (Z14) is positive (move toward the in close end of the focus lens), and the standard moving speed of tracing the in-focus cam locus on a tele-photo (T) side from the zoom position 606 (Z14) is negative (move toward the infinite end of the focus lens). When the focus lens 105 traces the cam locus 604 while completely maintaining an in-focus state, the magnitude of the AF evaluation signal maintains a maximum value 601. In general, the AF evaluation signal level has an almost constant value in zooming which maintains an in-focus state.

In FIG. 7B, let $V_{f0}$ be the standard moving speed of the focus lens which traces the in-focus cam locus 604 in zooming, and $V_f$ be the actual moving speed of the focus lens 105. If zooming is done by increasing/decreasing the focus lens moving speed $V_f$ from the standard focus lens moving speed $V_{f0}$, the focus lens 105 traces a zigzag locus 605. Then, the AF evaluation signal level shown in FIG. 7A repeats a peak and valley, as represented by a curve 603. The AF evaluation signal level curve 603 exhibits the maximum value 601 at positions ($Z_0, Z_2, Z_4, \ldots, Z_{16}$) where the loci 604 and 605 cross each other, and a minimum value 602 at positions ($Z_1, Z_3, Z_5, \ldots, Z_{15}$) where the moving vector of the locus 605 changes its direction.

If a level TH1 corresponding to the minimum value 602 is set as a switching point, and the moving vector of the locus 605 is switched every time the AF evaluation signal level reaches the level TH1, the switched moving direction of the focus lens 105 can be set to a direction close to the in-focus locus 604. That is, zooming which suppresses any blur can be achieved by controlling the moving direction and speed of the focus lens 105 so as to reduce the blur every time the image blurs by the difference between the maximum value 601 and the minimum value 602 (TH1) of the AF evaluation signal level.

In zooming from the wide-angle end to the tele-photo end in which the cam locus as shown in FIG. 4 diverges from convergence by the above-described method, the focus lens moving speed $V_f$ is controlled with respect to the standard moving speed (calculated using $p_{(n+1)}$ obtained by equation (1)) though the speed not is optimal for the object distance, unlike the standard moving speed $V_{f0}$ at which an in-focus state is maintained. At the same time, switching operation is repeated along the locus 605 in accordance with changes in AF evaluation signal level. As a result, a locus along which the AF evaluation signal level does not become lower than the minimum value 602 (TH1), i.e., a locus which does not generate any blur more than a predetermined amount can be selected. Appropriately setting the level TH1 enables zooming which reduces the blur amount so the user may not visually recognize the blur.

Letting $V_{f+}$ be the positive correction speed and $V_{f-}$ be the negative correction speed, the moving speed $V_f$ of the focus lens 105 is given by $$V_f = V_{f0} + V_{f+} \quad (4)$$

$$V_f = V_{f0} + V_{f-} \quad (5)$$

These correction speeds $V_{f+}$ and $V_{f-}$ are determined such that the internal angle defined by two vectors of the moving speed $V_f$ obtained by equations (4) and (5) is divided into two by the vector of the standard focus lens moving speed $V_{f0}$. This prevents any offset when a locus to be traced is selected by the zooming method. There is also proposed a method of changing the correction amount represented by the correction speed in accordance with an object to be to be picked up, the object distance, and the depth of field, changing the increase/decrease period of the AF evaluation signal, and thus improving the tracing locus selection precision.

In the control of the above-described magnification operation, an in-focus state is detected using an image signal from the image pickup element 106. The magnification operation control process is generally performed in synchronism with a vertical sync signal when this lens system is mounted in a video camera.

FIG. 8 is a flow chart showing conventional lens drive process procedures executed in the lens control microcomputer. This process will be explained along steps.

In step S701, the RAM and various ports in the microcomputer are initialized.

Step S702 is a routine for performing communication with a system control microcomputer (to be referred to as a "system computer" hereinafter) which controls the operation system of the camera main body. The lens control microcomputer receives, from the system computer, input information from a zoom SW unit operated by the operator. The lens control microcomputer transfers, to the system computer, information representing that zoom operation is in progress, and magnification operation information such as the zoom lens position. These pieces of information are displayed to the operator on a display or the like.

Step S703 is an AF process routine in which an automatic focus adjustment process is done in accordance with changes in AF evaluation signal.

Step S704 is a zoom process routine in which a compensation operation process for maintaining an in-focus state is performed in magnification operation. The standard drive direction and standard drive speed of the zoom lens 102 which traces a cam locus as shown in FIG. 5 are calculated by the above-mentioned method.

Step S705 is a selection routine of the drive direction and speed. Of the drive directions and drive speeds of the zoom lens 102 and focus lens 105 calculated in the process routines of steps S703 and S704, drive directions and drive speeds to be used are selected in accordance with AF operation, magnification operation, or the like. The lens is also set not to be driven toward the tele-photo side from the tele-photo end, the wide-angle side from the wide-angle end, the in close side from the in close end, and the infinity side from the infinite end. The tele-photo end, wide-angle end, in close end, and infinite end are set by software so as to prevent each lens from colliding with the movable end portion of the lens mechanism.

FIG. 9 is a graph showing an example of each end of the focus lens set by software.

For example, the in close photographing distance is 1 cm at the wide (W) end, and ensures 1 m through the total focal length. As typical loci stored in the lens control microcomputer, a locus 801 for an object distance of 5 mm and a locus 802 for an object distance of 90 cm are prepared. The 5-mm locus 801 is set as an in close end within a focal length range of a position 804 to a position 805. A fixed value 807 equal to the most in close position on the 90-cm locus 802 is set as an in close end within a focal length range of the position 805 to a position 806. The 90-cm locus 802 is set as an in close end within a focal length range on the tele-photo side from the position 806.

As for the infinite end, a locus 808 separated by a predetermined amount from an infinite locus 803 to the infinite direction is obtained and set as an infinite end.

In order to enable focusing at a photographing distance from the infinite end to the in close end, the in close end and infinite end of the focus lens must be set outside a range determined by the above in close end and infinite end. This is because, to focus the lens on a main object at infinity, the focus lens must be driven to the superinfinite side to confirm that the AF evaluation signal level decreases from the infinity-position level. On the in close side, the focus lens 105 is moved to an object distance of 90 cm over the position of a main object at, e.g., an object distance of 1 m. Only after it is confirmed that the AF evaluation signal level decreases, the lens can be focused to an object distance of 1 m. When the depth of field or the focal depth increases in accordance with the aperture state, the focal length range from the in close end to infinite end of the focus lens is set wider than a focusable photographing distance in order to facilitate focus adjustment. Further, the focal length range from the in close end to the infinite end is set wide in consideration of a blur which may be generated by expansion/contraction of the lens barrel upon changes in the ambient temperature or the like.

Referring back to FIG. 8, in step S706, drive/stop of each lens is controlled by outputting a control signal to the motor driver in accordance with the drive direction/drive speed information of the zoom lens and focus lens selected in step S705.

After the process of step S706 ends, the flow returns to step S702. A series of processes shown in FIG. 8 are executed in synchronism with a vertical sync period in a video camera when the lens system is mounted in the video camera. That is, the process starts in response to input of a vertical sync signal in the process of step S702.

When, however, the locus tracing method described with reference to FIGS. 7A and 7B is applied to the conventional inner focus type lens system, the AF evaluation signal varies due to movement of an object, the camera work, hand shake, or the like in zooming operation which refers to the AF evaluation signal. As a result, the correction speed direction may not be properly switched. In this case, locus tracing may be done in a direction apart from the in-focus locus.

Especially when the correction speed is added toward the infinite position in zooming in on an object at the infinite position, the lens is focused to a superinfinite position over the infinite position. Since the infinite end is set deep, as described above, the blur amount becomes large until the lens is reversely moved toward the in close end. The image quality provided to the photographer via the viewfinder or monitor becomes low.

When the focus lens is located at an in close position from the infinite in-focus position by a predetermined amount (near-focus state), only an object at the infinite position within the frame blurs, and an object at another position hardly blurs. To the contrary, when the focus lens falls within a superinfinite region on the superinfinite side from the infinite end by a predetermined amount, all objects within the frame blur. In this superinfinite region, the AF evaluation signal level abruptly decreases, and the in-focus direction cannot be accurately determined. It takes a long time for the focus lens to return to the infinite object position, giving the photographer a greatly blurred impression.

SUMMARY OF THE INVENTION

The present invention has been made to overcome the conventional drawbacks, and has as its object to provide a zoom lens control apparatus, zoom lens control method, program, and storage medium capable of preventing any blur in magnification operation and providing a comfortable photographing environment.

According to a feature of the present invention, a zoom lens control apparatus which has a first lens unit for executing magnification operation, and a second lens unit for correcting variations in image plane along with magnification operation of the first lens unit and serving as a focusing function, and drives the second lens unit on the basis of a focus adjustment signal comprises a first setting circuit which sets a first moving range for the second lens unit along with movement of the first lens unit, and a second setting circuit which sets a second moving range different from the moving range for the second lens unit along with movement of the first lens unit.

In particular, the second moving range is narrower than the first moving range, the second moving range is set in zooming from a wide-angle side to a tele-photo side, and the first moving range is set in zooming from the tele-photo side to the wide-angle side.

Further, the second moving range is set when the second lens unit is driven based on the focus adjustment signal in zooming from the wide-angle side to the tele-photo side, and the first moving range is set when the second lens unit is driven not based on the focus adjustment signal.

The first moving range is wider over an infinite object than a region surrounded by a moving range of the second lens unit when a focus is adjusted from an in close object to the infinite object, and the second moving range is closer to the infinite object than the first moving range and is narrower.

The first and second setting circuits include microcomputers.

In addition, the present invention is characterized by a program which controls the above-described apparatus. The above and other objects, features, and advantages of the present invention will be apparent from the following detailed description of the preferred embodiments in conjunction with the accompanying drawings.

DETAILED DESCRIPTION OF THE PREFERRED EMBODIMENT

Figure 1:
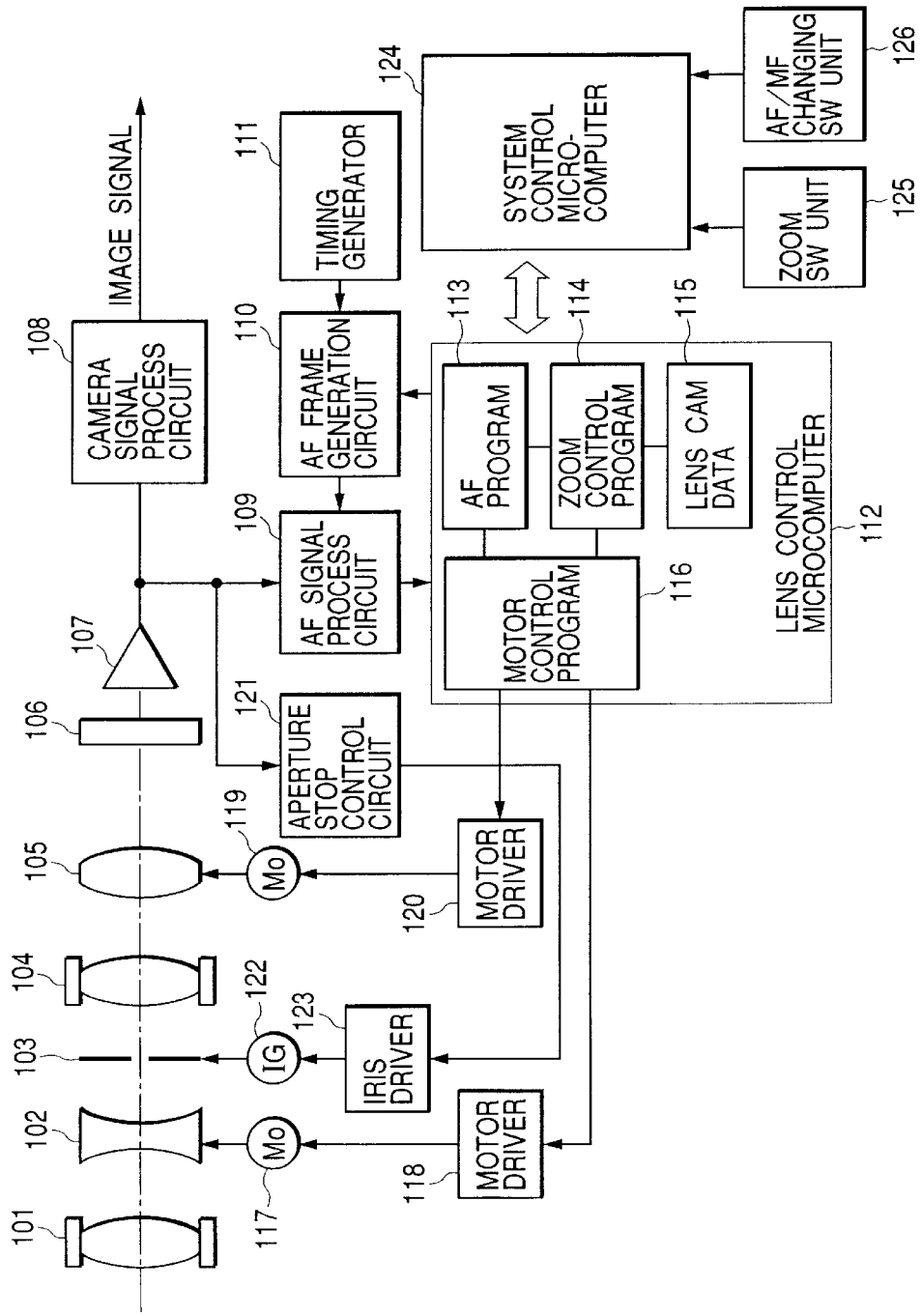
FIG. 1 is a block diagram showing the arrangement of an image pickup apparatus according to an embodiment of the present invention.

FIG. 1 is a block diagram showing the arrangement of an image pickup apparatus according to an embodiment of the present invention. The image pickup apparatus according to the embodiment is a video camera including an inner focus type lens system.

Figure 3:
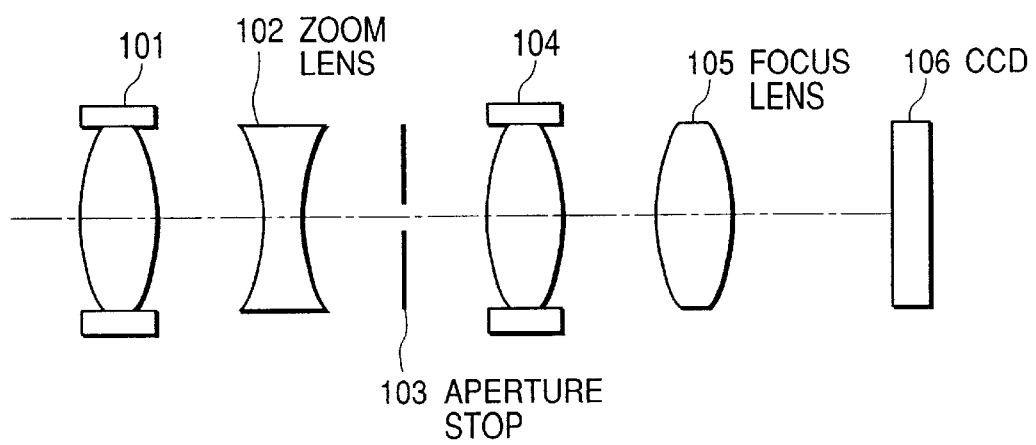
FIG. 3 is a view schematically showing the arrangement of an inner focus type lens system.
Figure 4:
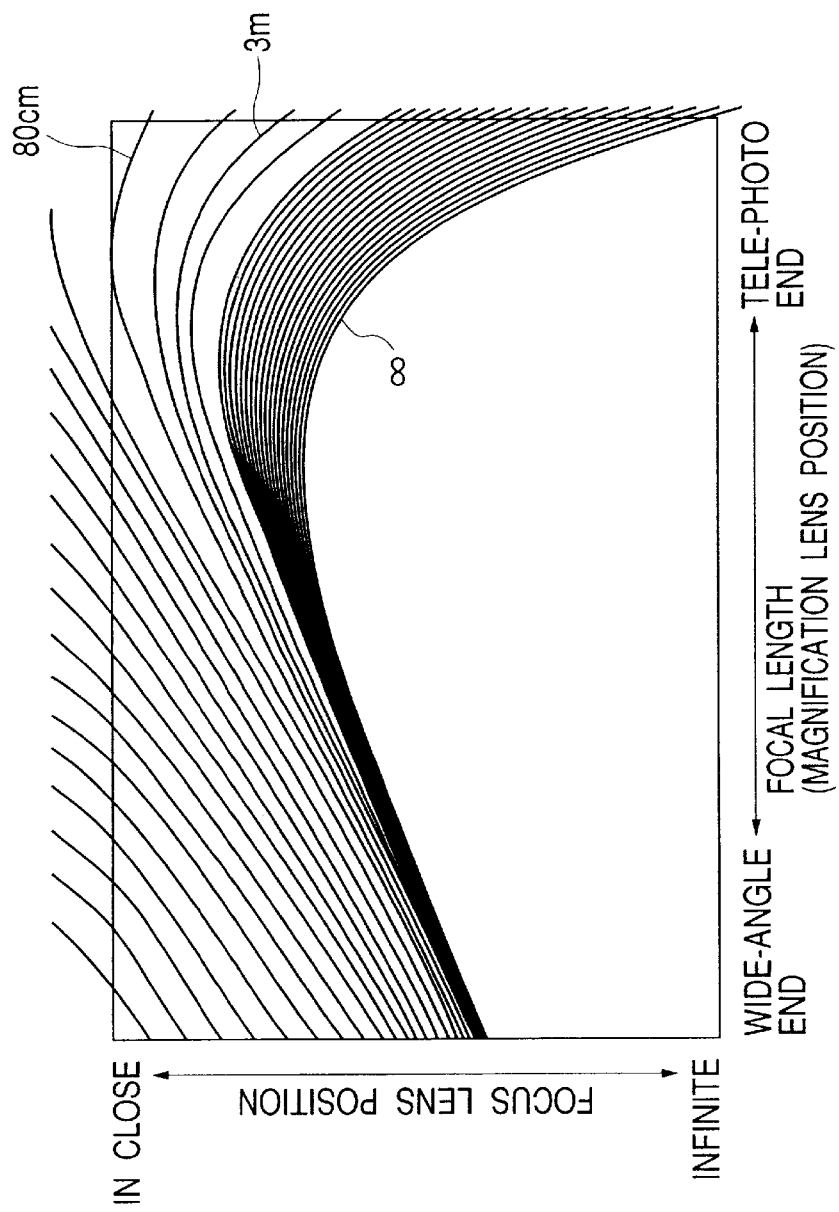
FIG. 4 is a graph showing a locus (curve) representing a focus lens position as a function of the focal length (zoom lens position) for each object distance.
Figure 5:
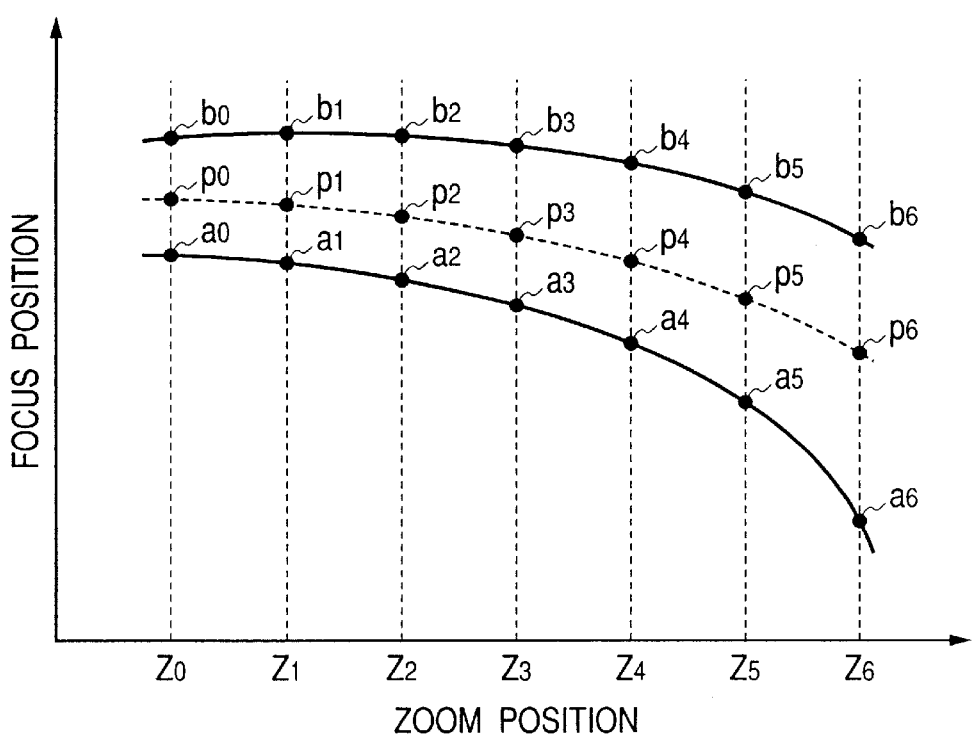
FIG. 5 is a graph showing an example of the locus characteristic used in a conventional locus tracing method applied when magnification operation is executed while an in-focus state is maintained using a stepping motor.
Figure 6:
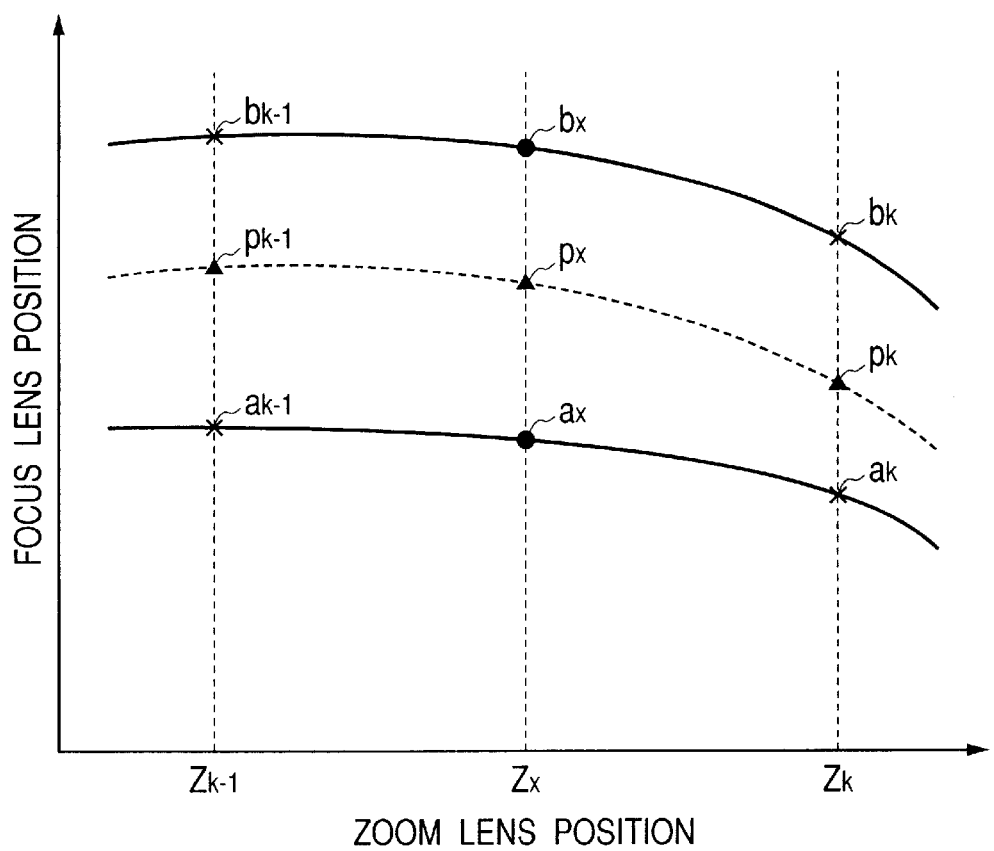
FIG. 6 is a locus graph for explaining an interpolation method in the direction of the magnification lens position.
Figure 7A:
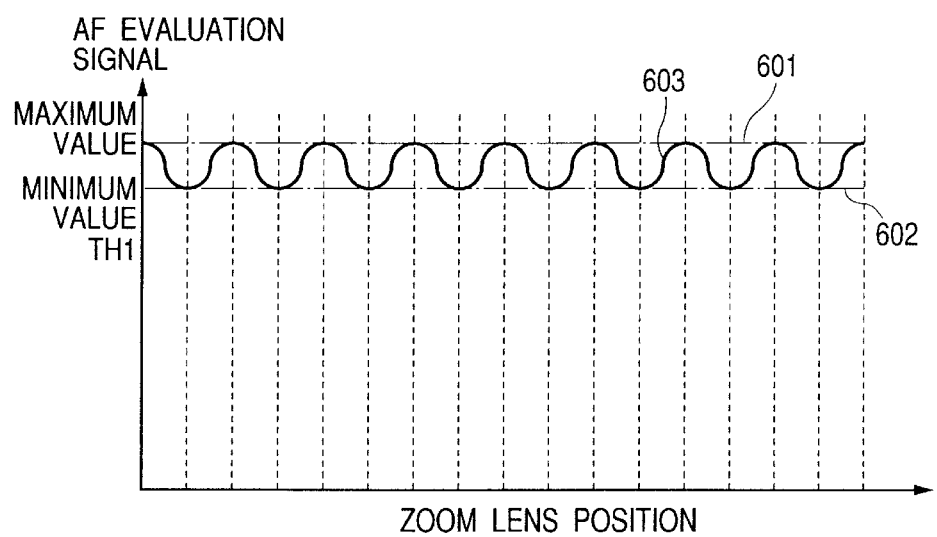
FIGS. 7A and 7B are graphs for explaining an example of the conventional locus tracing method.
Figure 7B:
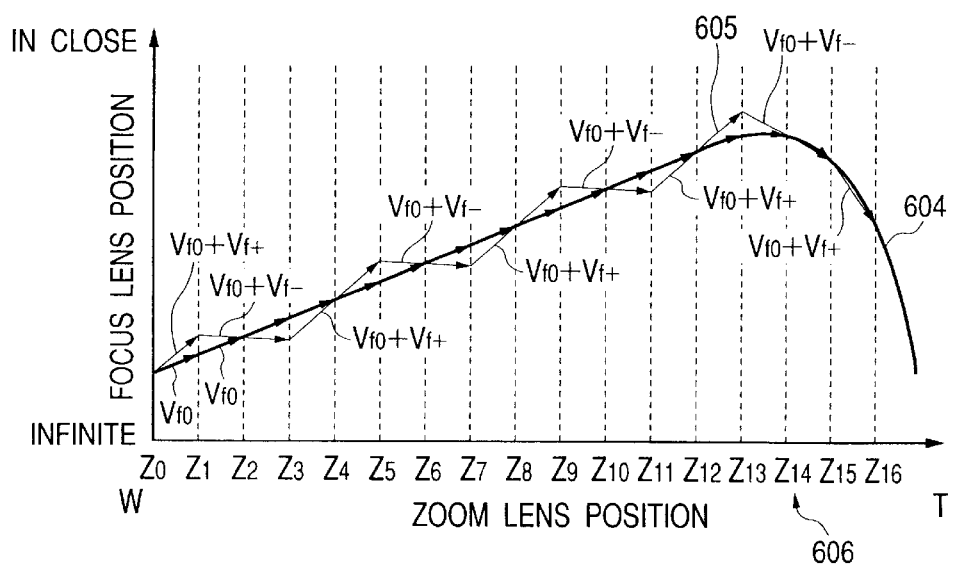

The inner focus type lens system in FIG. 1 has the same arrangement as that of the inner focus type lens system shown in FIG. 3. In FIG. 1, the same reference numerals as in the arrangement of FIG. 3 denote the same parts, and a description thereof will be omitted.

Image light having passed through a lens system forms an image on the plane of an image pickup element 106, and the image is photoelectrically converted into an image signal. The image signal is amplified to an optimal level by an amplifier 107, and input to a camera signal process circuit 108 where the image signal is converted into a standard television signal.

The image signal amplified by the amplifier 107 is sent to an aperture stop control circuit 121 and AF signal process circuit 109. The aperture stop control circuit 121 drives an iris driver 123 and IG meter 122 in accordance with the input level of the image signal, controls an aperture stop 103, and adjusts the quantity of light. The AF signal process circuit 109 receives a gate signal from an AF frame generation circuit 110, extracts only the high-frequency component of the image signal within an AF frame serving as a predetermined region frame of the image pickup frame, and performs a signal process. Based on vertical and horizontal sync signals sent from a timing generator 111, the AF frame generation circuit 110 generates a gate signal for extracting the image pickup frame within the AF frame.

A microcomputer (lens control microcomputer) 112 for controlling a lens has an AF program 113 for adjusting the focus in accordance with the magnitude of an AF evaluation signal, a zoom control program 114 for maintaining an in-focus state while tracing a cam locus, lens cam data 115 to be referred to in tracing a cam locus, and a motor control program 116 for independently driving a focus lens 105 and zoom lens 102 along the optical axis in AF operation or zoom operation. The lens control microcomputer 112 performs lens drive control and AF frame control for changing the distance measurement area.

The lens control microcomputer 112 communicates with a system control microcomputer 124. The system control microcomputer 124 sends output signals from a zoom SW unit 125 and AF/MF changing SW unit 126 to the lens control microcomputer 112. The lens control microcomputer 112 sends magnification operation information such as the zoom direction and focal length in zoom operation to the system control microcomputer 124. The zoom SW unit 125 is an integral zoom switch as a unit operated by the photographer. The zoom SW unit 125 A/D-converts a voltage corresponding to the rotation angle of an operation member, and outputs the signal to the system control microcomputer 124. Variable-speed zooming is done in accordance with this output signal. The AF/MF changing SW unit 126 is an operation switch which allows the photographer to select a mode (AF) in which the focus is automatically adjusted and a mode (MF) in which the focus is manually adjusted. An output from this switch is A/D-converted and output to the system control microcomputer 124.

Motor drivers 118 and 120 output drive energies to a zoom motor 117 for driving the zoom lens 102 and a focus motor 119 for driving the focus lens 105 in accordance with drive instructions to the zoom lens 102 and focus lens 105 that are output from the lens control microcomputer 112. The zoom motor 117 and focus motor 119 are respectively connected to the zoom lens 102 and focus lens 105, and drive them.

The zoom motor 117 and focus motor 119 are formed from stepping motors. A method of driving the zoom motor 117 and focus motor 119 will be explained.

The lens control microcomputer 112 determines the drive speeds of the zoom motor 117 and focus motor 119 by a program process, and sends the determined speeds as rotation frequency signals for the stepping motors to the motor driver 118 for driving the zoom motor 117 and the motor driver 120 for driving the focus motor 119. The lens control microcomputer 112 also sends, to the motor drivers 118 and 120, drive/stop signals for driving/stopping the zoom motor 117 and focus motor 119, and rotational direction signals designating the rotational directions of the motors. As for the zoom motor 117, the drive/stop signal and rotational direction signal are generated in accordance with mainly the state of the zoom SW unit 125. As for the focus motor 119, these signals are generated in accordance with a drive instruction determined by a process in the lens control microcomputer 112 in AF operation and zoom operation.

Each of the motor drivers 118 and 120 sets four motor excitation phases to the forward or backward rotation phase in accordance with the rotation direction signal. The motor driver changes an application voltage (or current) having the four motor excitation phases in accordance with the received rotation frequency signal, and outputs the resultant voltage (or current) to control the rotational direction and rotation frequency of the motor. Also, each of the motor drivers 118 and 120 executes/stops output of an application voltage (or current) to the motor in accordance with the drive/stop signal.

Figure 2:
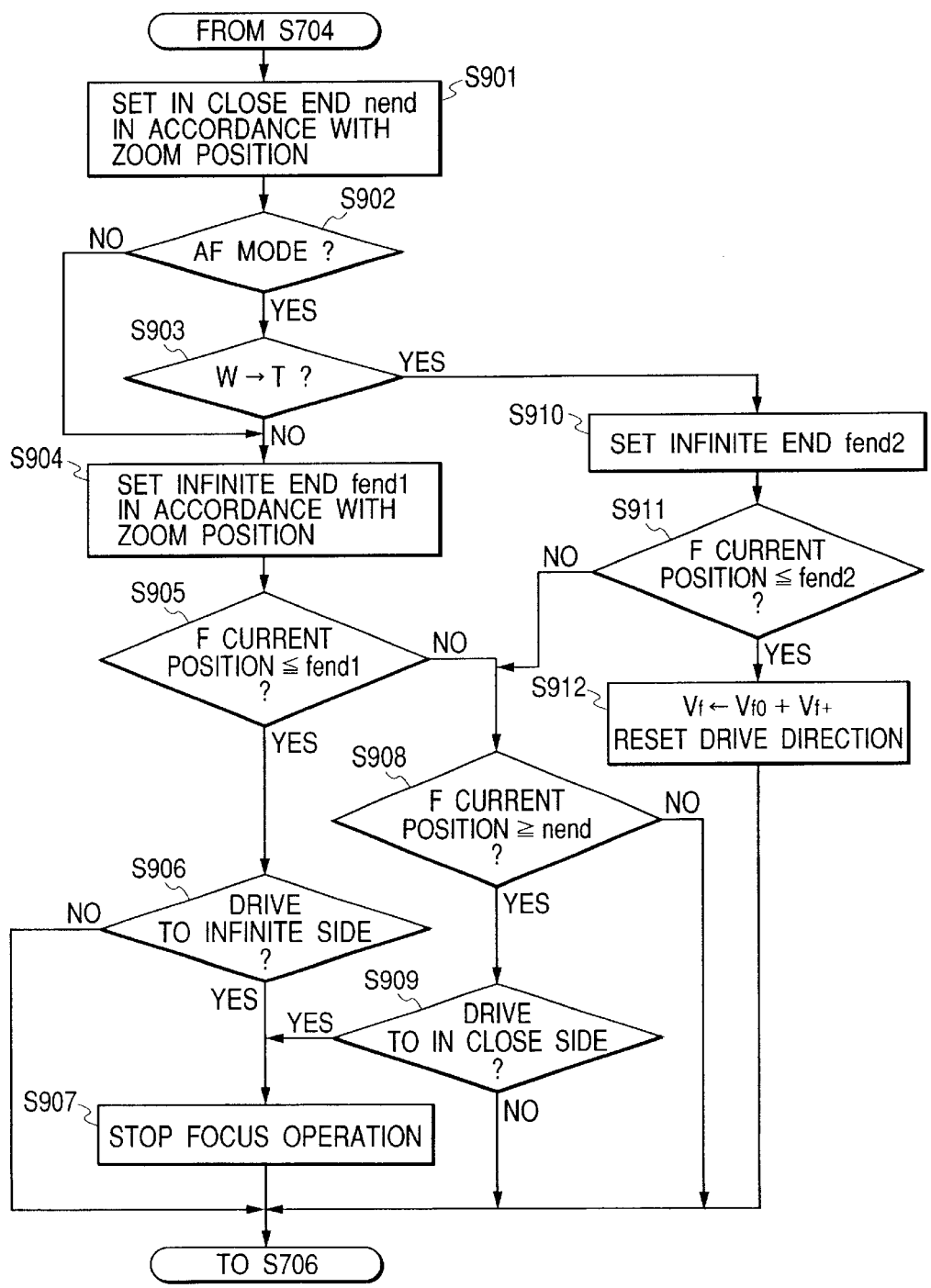
FIG. 2 is a flow chart showing some of lens drive process procedures executed by a lens control microcomputer in the embodiment of the present invention.
Figure 8:
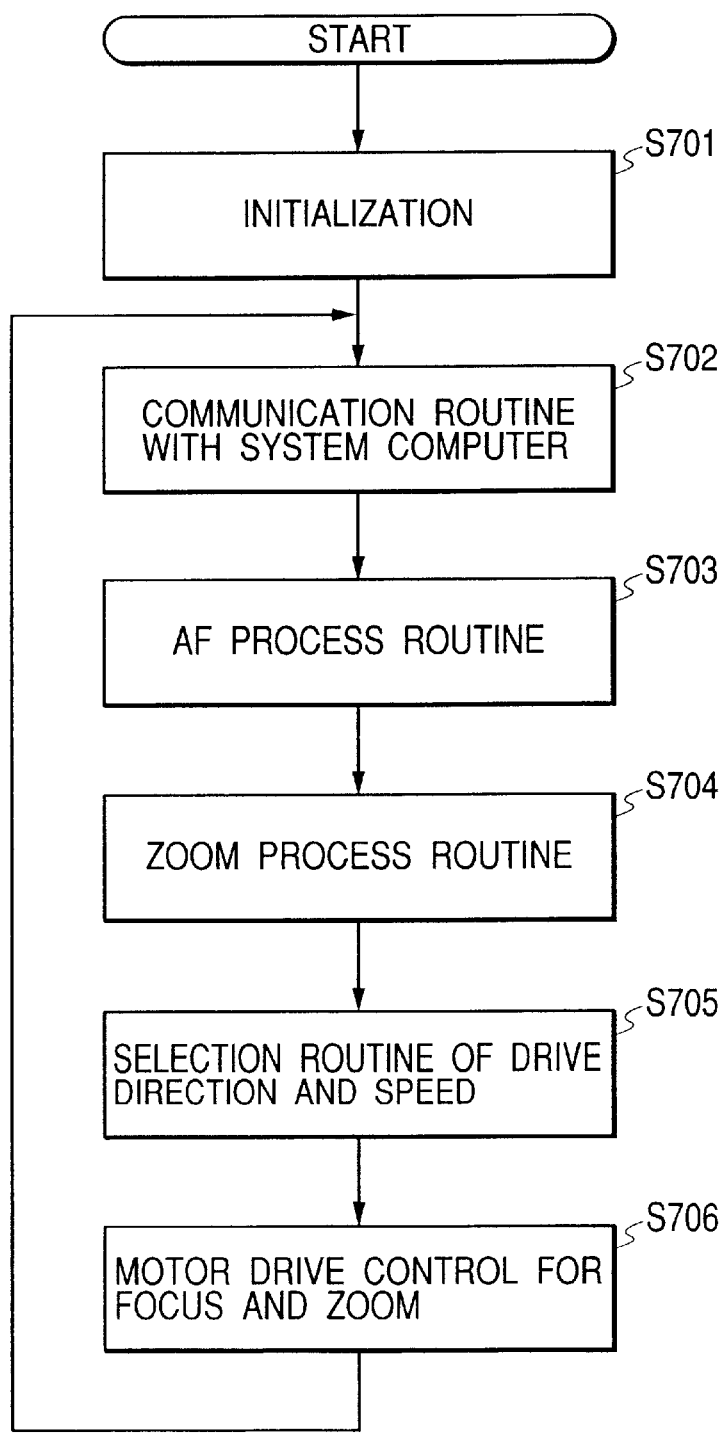
FIG. 8 is a flow chart showing conventional lens drive process procedures performed in the lens control microcomputer.

FIG. 2 is a flow chart showing some of lens drive process procedures performed in the lens control microcomputer 112. The lens control microcomputer 112 according to the embodiment of the present invention executes basically the same process as the lens drive process shown in FIG. 8. However, the lens control microcomputer 112 according to the embodiment of the present invention executes a process with different contents, instead of step S705 in the lens drive process shown in FIG. 8. FIG. 2 is a flow chart showing a process corresponding to step S705 of FIG. 8 that is executed by the lens control microcomputer 112 in the embodiment of the present invention. FIG. 2 does not show speed setting, direction setting, and a zoom end process, and shows only a focus end process, which is a feature of the present invention.

Figure 9:
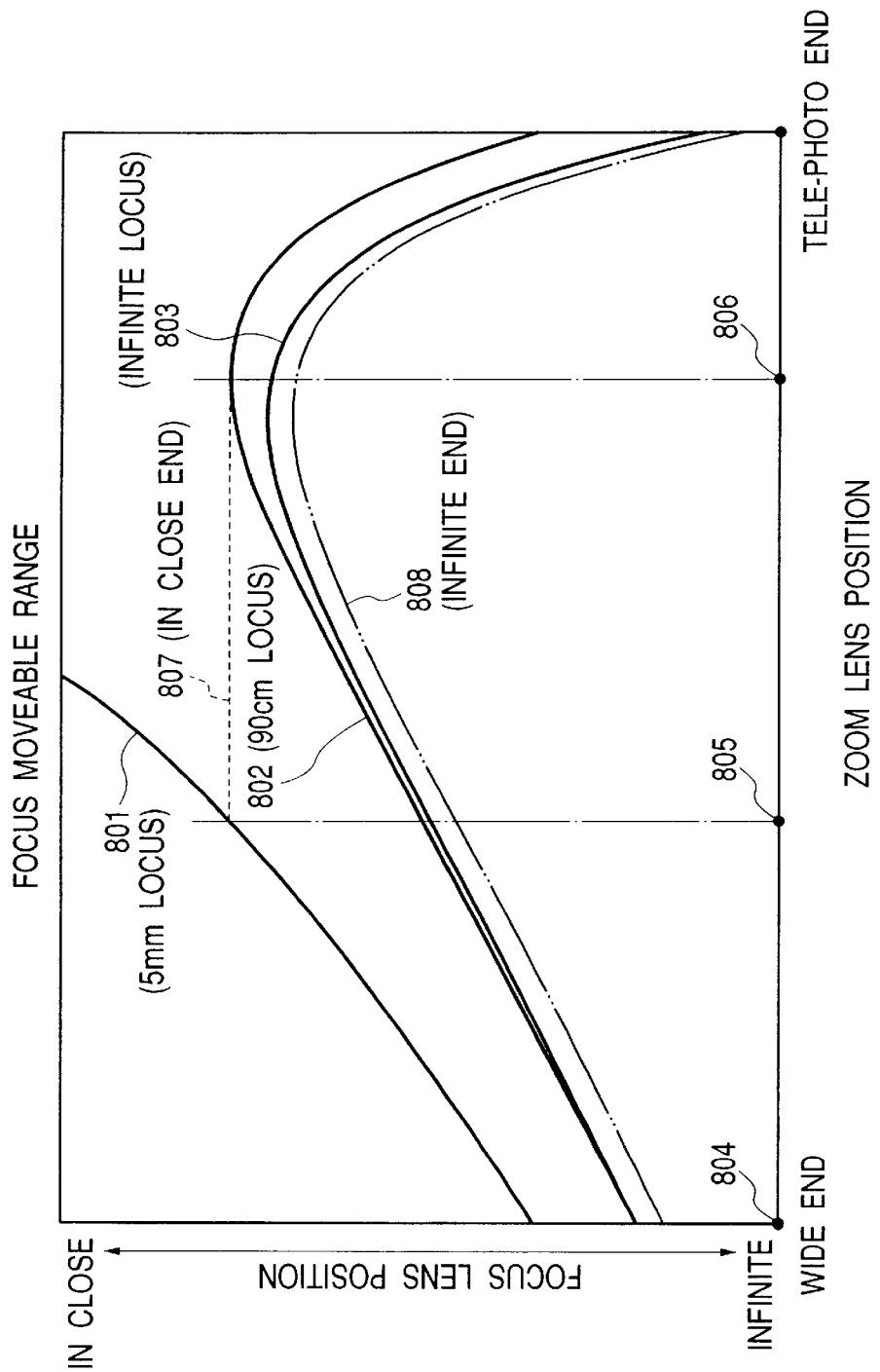
FIG. 9 is a graph showing each end of a focus lens set by software.

In step S901 of FIG. 2, the lens control microcomputer 112 sets an in close end "nend" in accordance with the zoom lens 102. Similar to the setting method described with reference to FIG. 9, the in close end "nend" is set for each focal length range to a cum locus at a predetermined object distance (e.g., locus 801 within a focal length range of the position 804 to the position 805, or locus 802 within a focal length range of the position 806 to T), and a fixed focus lens position (e.g., in close end 807 within a focal length range of the position 805 to the position 806).

In step S902, the lens control microcomputer 112 checks whether the setting mode in the AF/MF changing SW unit 126 that is transmitted from the system control microcomputer 124 is the AF mode. In step S903, the lens control microcomputer 112 checks whether a signal output from the zoom SW unit 125 represents movement of the zoom lens 102 from the wide-angle (W; short focal length) side to the tele-photo (T; long focal length)side. If the AF mode is set and zooming from the wide-angle side to the tele-photo side is in progress as a result of determination in steps S902 and S903, the flow advances to step S910; otherwise, to step S904.

In step S904, the lens control microcomputer 112 sets a first infinite end "fend1" in accordance with the zoom lens 102. The infinite end "fend1" is set similarly to the infinite end 808 described with reference to FIG. 9. The infinite end "fend1" is set to a position separated by a predetermined amount from an infinite cam locus (e.g., infinite locus 803 in the example of FIG. 9) over an infinite locus in correspondence with the focal length.

Then, the lens control microcomputer 112 checks whether the current position of the focus lens 105 is the infinite end "fend1" or lower (infinite direction; lower region in FIG. 9) (S905). If YES in step S905, the lens control microcomputer 112 checks whether the drive direction of the focus lens 105 is set to the infinite side (S906). If YES in step S906, the flow shifts to step S907, and the lens control microcomputer 112 sets a moving stop instruction for the focus lens 105 in order to stop focusing. The flow advances to step S706 in FIG. 8, and stops movement of the focus lens 105. If NO in step S906, the flow directly shifts to step S706 in FIG. 8.

If NO in step S905, the flow advances to step S908, and checks whether the current position of the focus lens 105 is the in close end "nend" or higher (in close direction) If YES in step S908, the lens control microcomputer 112 checks whether the drive direction of the focus lens 105 is set to the in close side (S909). If YES in step S909, the flow shifts to step S907, and the lens control microcomputer 112 sets a moving stop instruction for the focus lens 105 in order to stop focusing. The flow advances to step S706 in FIG. 8, and the lens control microcomputer 112 stops movement of the focus lens 105. If NO in step S909, the flow directly shifts to step S706 in FIG. 8.

If the AF mode is set and zooming from the wide-angle side to the tele-photo side is in progress, the flow advances to step S910, and the lens control microcomputer 112 sets a second infinite end "fend2". The second infinite end "fend2" is set to a position separated by a predetermined amount α (=a focal depth×β) from an infinite cam locus to the infinite direction in correspondence with the focal length. The focal depth is determined as (permissible circle δ of confusion× F-number/position sensitivity) in accordance with the F-number of an optical lens group corresponding to the stop aperture diameter, the permissible circle δ of confusion corresponding to the pixel size of the image pickup element 106, and the position sensitivity of the focus lens 105. In other words, the second infinite end "fend2" is a position closer to the infinite locus 803 than the locus 808 corresponding to the first infinite end "fend1".

Note that β is gain data containing a decimal point, and is actually determined by n/m (n and m are both integers). By changing β, the second infinite end fend2 can be tuned in accordance with the trace performance in zooming.

In this manner, the second and first infinite ends "fend2" and "fend1" are so set as to meet a positional relationship: "fend2">"fend1" (larger value in the in close direction). This setting reduces the occurrence frequency of the positional state of the focus lens 105 in which the entire photographing frame blurs during zooming from the wide-angle end to the tele-photo end in the AF mode, i.e., the state in which the focus lens 105 is located in the superinfinite region. Any blur can be prevented during zooming, and stable zooming performance can be maintained even for a photographing scene in which the AF evaluation signal value varies upon a change in camera work or object during zooming operation to generate a malfunction.

In step S911, the lens control microcomputer 112 checks whether the current position of the focus lens 105 is the second infinite end "fend2" or lower (infinite direction). If YES in step S911, the flow advances to step S912, and the lens control microcomputer 112 sets the focus moving speed $V_f$ to (cam tracing reference speed $V_{f0}$+ correction speed $V_{f+}$ in the in close direction) by using the above-described equation (4). Then, the focus lens 105 can escape from the second infinite end "fend2". At the same time, the drive direction of the focus lens 105 is reset in accordance with the sign of the focus moving speed $V_f$.

If NO in step S911, the flow advances to step S908.

As described above, according to the embodiment of the present invention, the second infinite end "fend2" is set to the in close side separately from the first infinite end "fend1". During zooming operation which refers to the AF evaluation signal, the movable range of the focus lens 105 is restricted by the second infinite end "fend2". The focus lens 105 can be prevented from deviating from an in-focus locus even in a photographing scene in which the AF evaluation signal value varies owing to movement of an object, camera work, hand shake, or the like. The present invention can prevent giving the photographer a greatly blurred impression that all objects within the frame are blurred.

The present invention is also achieved when a storage medium which stores software program codes for realizing the functions of the above-described embodiment is supplied to a system or apparatus and the computer (or the CPU or MPU) of the system or apparatus reads out and executes the program codes stored in the storage medium.

In this case, the program codes read out from the storage medium realize the functions of the above-described embodiment. The storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The functions of the above-described embodiment are realized when the computer executes the readout program codes. The present invention also includes a case in which an OS running on the computer performs some or all of actual processes on the basis of the instructions of the program codes and the processes realize the functions of the above-described embodiment.

The present invention also includes a case in which the program codes read out from the storage medium are written in the memory of a function expansion board inserted into the computer or the memory of a function expansion unit connected to the computer, the CPU of the function expansion board or function expansion unit performs some or all of actual processes on the basis of the instructions of the program codes, and the processes realize the functions of the above-described embodiment.

As has been described in detail above, according to the present invention, at least the first movable range and the second movable range different from the first movable range are set for movement of the second lens unit along with movement of the first lens unit in a zoom lens control apparatus which moves the second lens unit for correcting the focal plane along with movement of the first lens unit for performing magnification operation.

The frequency at which the second lens unit (focus lens) is located in the superinfinite region where all objects within the frame blur can be reduced even in a photographing scene in which the in-focus evaluation signal (AF evaluation signal) varies owing to movement of an object, camera work, hand shake, or the like. The present invention can provide an excellent image pickup apparatus which can prevent the second lens unit (focus lens) from deviating from an in-focus locus, can eliminate difficulty in determining the moving direction of the second lens unit (focus lens) for focus adjustment due to a low AF evaluation value level in the superinfinite region, and can always realize stable magnification performance.

What is claimed is:

1. A zoom lens control apparatus which has a first lens unit for executing magnification operation, and a second lens unit for correcting variations in image plane along with magnification operation of the first lens unit and serving as a focusing function, and drives the second lens unit on the basis of a focus adjustment signal, comprising:

a first setting circuit which sets a first moving range for the second lens unit along with movement of the first lens unit; and a second setting circuit which sets a second moving range different from the moving range for the second lens unit along with movement of the first lens unit.

2. An apparatus according to claim 1, wherein the second moving range is narrower than the first moving range, the second moving range is set in zooming from a wide-angle side to a tele-photo side, and the first moving range is set in zooming from the tele-photo side to the wide-angle side.

3. An apparatus according to claim 2, wherein the second moving range is set when the second lens unit is driven based on the focus adjustment signal in zooming from the wide-angle side to the tele-photo side, and the first moving range is set when the second lens unit is driven not based on the focus adjustment signal.

4. An apparatus according to claim 1, wherein the first moving range is wider over an infinite object than a region surrounded by a moving range of the second lens unit when a focus is adjusted from an in close object to the infinite object, and the second moving range is closer to the infinite object than the first moving range and is narrower.

5. An apparatus according to claim 1, wherein said first and second setting circuits include microcomputers.

6. A control program for a zoom lens control apparatus which has a first lens unit for executing magnification operation, and a second lens unit for correcting variations in image plane along with magnification operation of the first lens unit and serving as a focusing function, and drives the second lens unit on the basis of a focus adjustment signal, comprising:

a first setting program which sets a first moving range for the second lens unit along with movement of the first lens unit; and a second setting program which sets a second moving range different from the moving range for the second lens unit along with movement of the first lens unit.

7. A program according to claim 6, wherein the second moving range is narrower than the first moving range, the second moving range is set in zooming from a wide-angle side to a tele-photo side, and the first moving range is set in zooming from the tele-photo side to the wide-angle side.

8. A program according to claim 7, wherein the second moving range is set when the second lens unit is driven based on the focus adjustment signal in zooming from the wide-angle side to the tele-photo side, and the first moving range is set when the second lens unit is driven not based on the focus adjustment signal.

9. A program according to claim 6, wherein the first moving range is wider over an infinite object than a region surrounded by a moving range of the second lens unit when a focus is adjusted from an in close object to the infinite object, and the second moving range is closer to the infinite object than the first moving range and is narrower.

* * * * *

UNITED STATES PATENT AND TRADEMARK OFFICE
CERTIFICATE OF CORRECTION

PATENT NO. : 6,661,585 B2
DATED : December 9, 2003
INVENTOR(S) : Hiroto Okawara

It is certified that error appears in the above-identified patent and that said Letters Patent is hereby corrected as shown below:

Column 4,
Line 67, "to be" (second occurrence) should be deleted.

Column 9,
Line 63, "length)side." should read -- length) side. --.

Signed and Sealed this

Sixth Day of July, 2004

JON W. DUDAS
*Acting Director of the United States Patent and Trademark Office*